(12) United States Patent
Kelly et al.

(10) Patent No.: US 6,893,768 B2
(45) Date of Patent: May 17, 2005

(54) FUEL DISTRIBUTION SYSTEM FOR A FUEL CELL STACK

(75) Inventors: Sean M. Kelly, Churchville, NY (US); Kevin R. Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 353 days.

(21) Appl. No.: 10/133,600

(22) Filed: Apr. 26, 2002

(65) Prior Publication Data

US 2003/0203272 A1 Oct. 30, 2003

(51) Int. Cl.⁷ .................................................. H01M 8/24
(52) U.S. Cl. ........................................ 429/38; 429/39
(58) Field of Search ............................ 429/34, 38, 12, 429/39

(56) References Cited

U.S. PATENT DOCUMENTS

| | | | |
|---|---|---|---|
| 6,321,145 B1 | 11/2001 | Rajashekara | |
| 6,423,896 B1 | 7/2002 | Keegan | |
| 6,455,185 B2 | 9/2002 | Bircann et al. | |
| 6,485,852 B1 | 11/2002 | Miller et al. | |
| 6,509,113 B2 | 1/2003 | Keegan | |
| 6,551,734 B1 | 4/2003 | Simpkins et al. | |
| 6,562,496 B2 | 5/2003 | Faville et al. | |
| 6,608,463 B1 | 8/2003 | Kelly et al. | |
| 6,613,468 B2 | 9/2003 | Simpkins et al. | |
| 6,613,469 B2 | 9/2003 | Keegan | |
| 6,627,339 B2 | 9/2003 | Haltiner, Jr. | |
| 6,630,264 B2 | 10/2003 | Haltiner, Jr. et al. | |
| 2003/0077498 A1 * | 4/2003 | Cable et al. | 429/32 |

* cited by examiner

Primary Examiner—Stephen Kalafut
Assistant Examiner—Raymond Alejandro
(74) Attorney, Agent, or Firm—Paul L. Marshall

(57) ABSTRACT

An improved system for more uniformly distributing gaseous fuel over the anode surface of a fuel cell, comprising an interconnect subassembly for electrically connecting anodes and cathodes of adjacent fuel cells in a fuel cell stack. The subassembly includes a perforated plate disposed adjacent the anode surface. The plate may be parallel to or inclined to the anode surface and forms a first wall of a fuel plenum for uniformly distributing fuel via the perforations over the entire surface of the anode. The second wall of the plenum is a plate separating the fuel flow from air flowing across the cathode. Electrical continuity across the interconnect subassembly may be provided, for example, by non-planar upsets such as bumps and dimples in the two plenum plate components, or by metallic foam or filaments disposed between the plates and the electrodes.

16 Claims, 3 Drawing Sheets

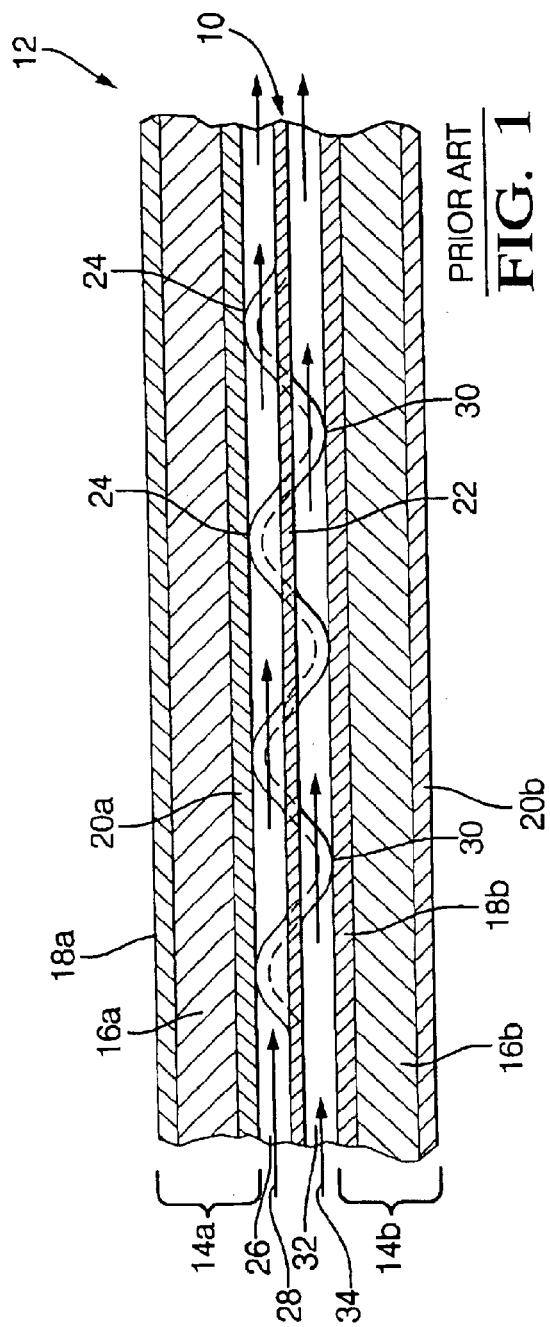
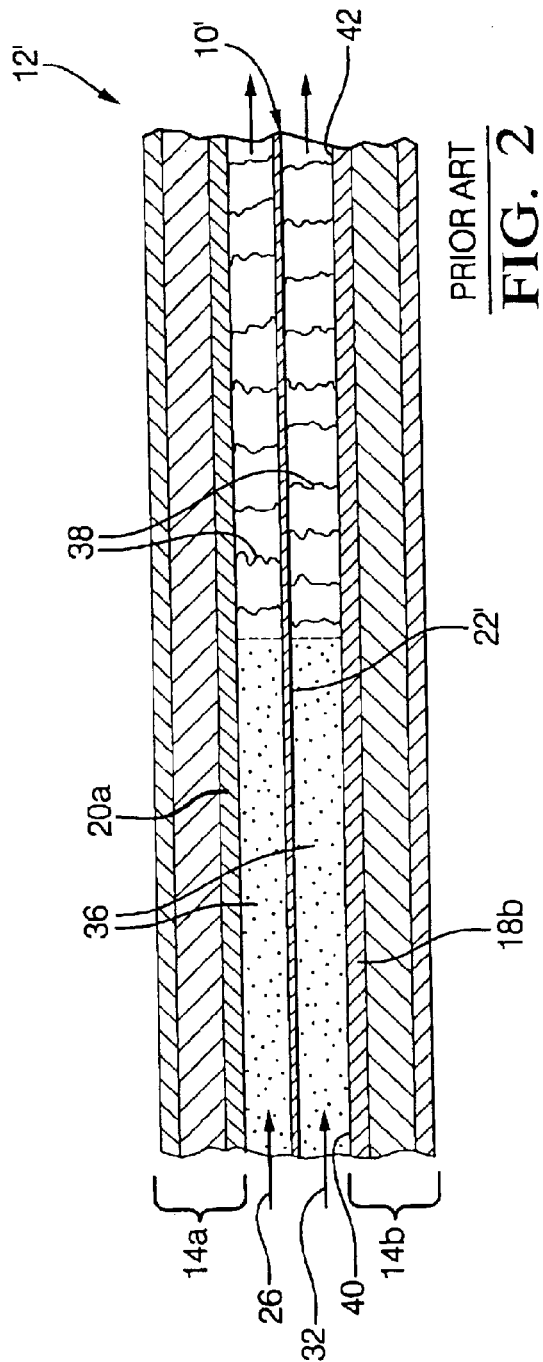

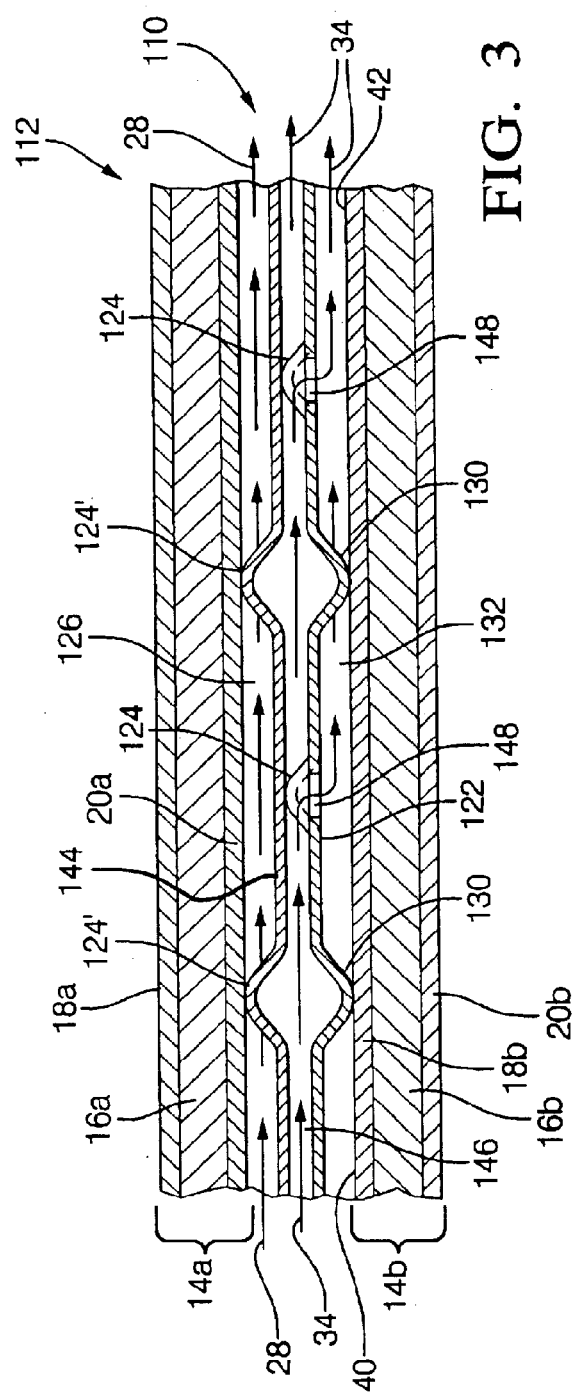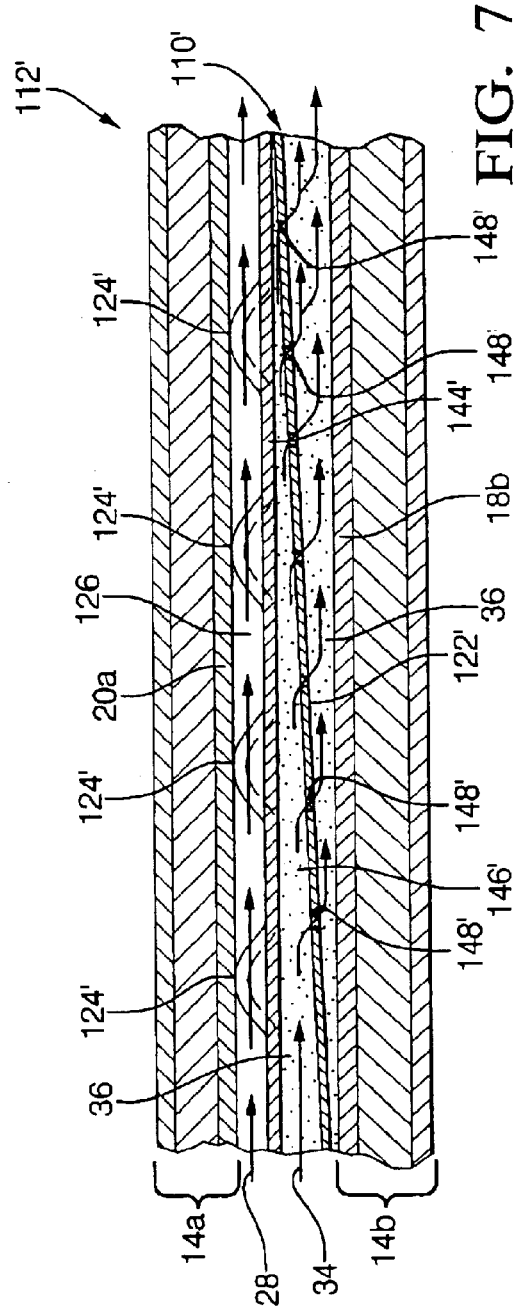

FUEL DISTRIBUTION SYSTEM FOR A FUEL CELL STACK

TECHNICAL FIELD

The present invention relates to fuel cells; more particularly, to fuel cells wherein a gaseous fuel such as hydrogen or reformed gasoline is flowed across the surface of an anode layer; and most particularly, to such a fuel cell wherein means is included for distributing fresh fuel to all portions of the anode layer surface.

BACKGROUND OF THE INVENTION

Fuel cells are well known as devices for converting chemically-stored energy directly into electricity. One such type of fuel cell employs a solid-oxide electrolyte having a cathodic layer deposited on a first surface and an anodic layer deposited on a second and opposite surface. Oxygen atoms are reduced to $O^{-2}$ by the cathodic layer, migrate through the electrolyte, and unite with protons produced from hydrogen by the anodic layer to form water, and, in the case of reformed gasoline, with CO to form $CO_2$. Electrons flow from the anode via an external path to the cathode through the cell interconnect.

A plurality of such fuel cells may be assembled in series to form a fuel cell stack. The individual fuel cells are electrically connected to each other by interconnect elements between the electrodes to maintain electrical continuity. Each interconnect is mechanically and electrically connected on one side through a fuel flow space to an adjacent anode and on the other side through an air flow space to an adjacent cathode. Such connection is known to be provided by incorporation of conductive filaments or metallic sponge in the respective gas flow spaces between the electrodes and the interconnects.

Oxygen is provided to the cathode surface, typically in the form of air, in abundance as a coolant as well as an oxidant for the fuel cell. Fresh air is introduced via a first inlet manifold means to the air flow space at an entry edge of the cathode surface, flows across the surface, and is removed via a first exit manifold at an exit edge of the cathode surface. Hydrogen-containing gas is introduced via a second inlet manifold means to the fuel flow space at an entry edge of the anode surface, flows across the surface, and is removed via a second exit manifold at an exit edge of the anode surface. Typically, but not necessarily, such a fuel cell is rectangular in plan view, and the oxygen and fuel flow through the fuel cell orthogonally to each other.

A serious problem is known in the art which adversely affects both fuel utilization efficiency and electrical output of the cell or stack. The anode surface near the entry edge is exposed to fresh fuel with no combustion byproducts in it, such as $H_2O$ and $CO_2$. Thus, the reaction rate and electricity production is relatively high in this region of the anode. However, as the fuel sweeps across the anode toward the exit edge, it picks up, and becomes diluted by, such byproducts while simultaneously becoming relatively depleted of $H_2$ and CO. Thus, the reaction rate and electricity production become progressively reduced in anode regions farther from the entry edge. Because of this phenomenon, these regions of the anode are sub-optimized, or under-utilized, in production of electricity.

Further, a relatively large and potentially damaging temperature difference may result between high-reaction and low-reaction areas of the anode.

Therefore, there is a strong need for an improved means for distributing fuel more uniformly over all portions of the anode surface.

It is a principal object of the invention to improve temperature uniformity within a fuel cell.

SUMMARY OF THE INVENTION

Briefly described, the present invention is directed to an improved interconnect system for more uniformly distributing gaseous fuel over the anode surface of a fuel cell. The system comprises an interconnect subassembly for electrically connecting anodes and cathodes of adjacent fuel cells in a fuel cell stack. The subassembly includes a perforated distributor plate disposed adjacent the anode surface. The distributor plate may be parallel to or inclined to the anode surface and forms a first wall of a fuel plenum for uniformly distributing fuel via the perforations over the entire surface of the anode. The second wall of the plenum is a second, imperforate plate separating the fuel flow plenum from air flowing across the adjacent cathode. Electrical continuity across the interconnect subassembly may be provided by non-planar upsets in the two plenum plate components, such as bumps and dimples, or by metallic foam or filaments disposed between the plates and the electrodes.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which:

FIG. 1 is a schematic elevational cross-sectional view of a first prior art interconnect element disposed between adjacent fuel cells in a fuel cell stack, showing upsets in the interconnect plate, in the form of bumps and dimples, for making electrical contact with the anode and cathode of the adjacent interconnected fuel cells;

FIG. 2 is a schematic elevational cross-sectional view of a second prior art interconnect element disposed between adjacent fuel cells in a fuel cell stack, showing metallic sponge and conductive filaments for making electrical contact with the anode and cathode of the adjacent interconnected fuel cells;

FIG. 3 is a schematic elevational cross-sectional view of a first embodiment of a combined interconnect and fuel distribution system in accordance with the invention;

FIG. 4 is an exploded isometric view from above of the embodiment shown in FIG. 3;

FIG. 7 is a schematic elevational cross-sectional view of a second embodiment of an interconnect fuel distribution system in accordance with the invention.

DESCRIPTION OF THE PREFERRED EMBODIMENTS

Figure 5:
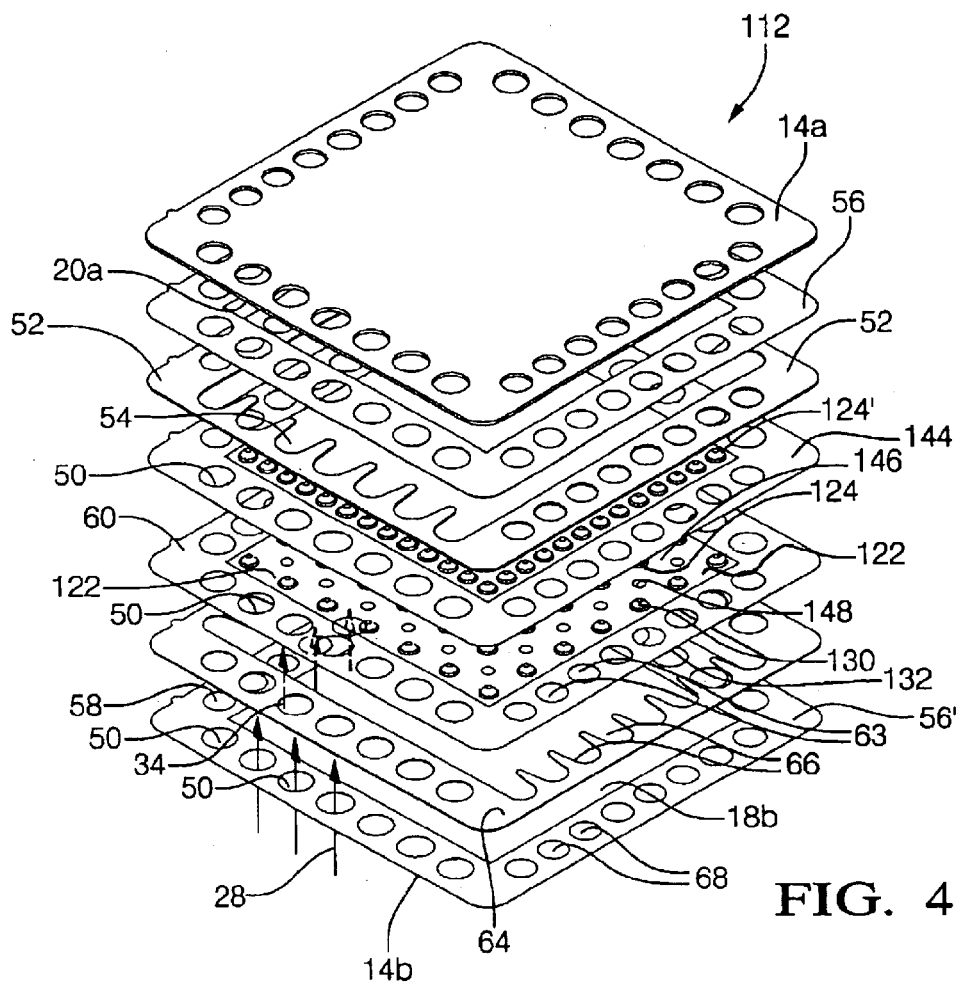
FIG. 5 is a detailed plan view of a portion of a perforated distribution plate for forming a first wall of a fuel plenum in accordance with the invention, showing a currently preferred arrangement of perforations, bumps, and dimples.

Referring to FIG. 1, a first embodiment of a prior art interconnect 10 is disposed in a portion of a fuel cell stack 12. Stack 12 includes a first fuel cell 14a and a second fuel cell 14b, interconnect 10 providing electrical conductivity therebetween. First fuel cell 14a includes a solid-oxide electrolyte 16a having a planar anode layer 18a attached to one surface thereof and a planar cathode layer 20a attached to an opposite surface thereof to define a fuel cell or PEN (positive-electrolyte-negative assembly). Second fuel cell 14b is identically constructed of analogously numbered components and includes a solid-oxide electrolyte 16b having a planar anode layer 18b attached to one surface thereof and a planar cathode layer 20b attached to an opposite surface thereof to define a fuel cell or PEN. Interconnect 10 includes an electrically-conductive plate 22 having a plurality of non-planar upsets extending away from both planar surfaces of plate 22 in the form of "bumps," defined herein as upsets extending toward a cathode, and "dimples," defined herein as upsets extending toward an anode. Bumps 24 are formed in plate 22 in mechanical and electrical contact with the surface of cathode 20a in the first fuel cell PEN 14a, serving to offspace plate 22 from cathode 20a and thereby defining an air flow space 26 therebetween for supply of air 28 to the cathode surface. Dimples 30 are in mechanical and electrical contact with the surface of anode 18b in the second fuel cell PEN 14b, serving to offspace plate 22 from anode 18b and thereby defining a fuel flow space 32 therebetween for supply of fuel 34 to the anode surface. Bumps 24 and dimples 30 typically are arranged in predetermined patterns, which may or may not be regular, and the air and fuel flow through their respective spaces 26,32 around the bumps and dimples.

Referring to FIG. 2, a second embodiment of a prior art interconnect 10' is disposed in a portion of a fuel cell stack 12' including a first fuel cell PEN 14a and second fuel cell PEN 14b, interconnect 10' providing electrical conductivity therebetween. Interconnect 10' includes an electrically-conductive plate 22' disposed between PENs 14a, 14b to form flow spaces 26,32, as in the first embodiment. Instead of bumps and dimples to provide conductivity, interconnect 10' includes either a porous metallic foam 36, for example, foamed nickel, or a plurality of conductive filaments 38 extending from plate 22' to cathode 20a and anode 18b.

As described above, the prior art embodiments as shown in FIGS. 1 and 2 are unable to prevent fuel from undergoing a continuous change in composition between the entry edge 40 and the exit edge 42 of anode 18b, by continuous reaction and removal of combustibles and continuous addition of combustion products.

Referring to FIGS. 3 and 4, a first embodiment 110 of an improved interconnect and fuel distribution system in accordance with the invention, included in an improved fuel cell stack 112, includes a first interconnect plate 122 similar to prior art plate 22, having bumps 124 and dimples 130 extending from opposite sides of plate 122, the dimples 130 forming electrical contact with anode 18b as in the prior art to create a fuel flow space 132 for flow of fuel 34 adjacent anode 18b. Disposed between first plate 122 and cathode 20a is a second interconnect plate 144 having bumps 124' extending into electrical contact with cathode 20a and thereby forming an air flow space 126 therebetween for flow of air 28 along cathode 20a. Second plate 144 is off-spaced from first plate 122 by the height of bumps 124, which bumps alternatively may be provided as dimples in plate 144 to equal effect, to form a plenum 146 therebetween for receiving fuel 34, which in operation fills plenum 146. First plate 122 is provided with a plurality of holes 148 extending between plenum 146 and fuel flow space 132 for allowing the fuel to flow from the plenum into the flow space. While the average mass flow from entry edge 40 to exit edge 42 is the same as in the prior art fuel cell stacks, the composition of the gas experienced by the anode surface is very different. The number of holes 148, their spacing, and the pattern of holes are such that all portions of the anode surface continually receive fresh fuel through holes 148 from plenum 146. Although a contaminant gradient must still exist in the fuel between entry edge 40 and exit edge 42, because combustion is still occurring over the entire surface, the gradient is much diminished over that in prior art stack 12 by admixture of fresh fuel to spent fuel over the whole surface.

Referring to FIG. 4, a fuel cell stack 112 may include other mechanical components not shown schematically in FIG. 3. As noted previously, air and fuel flow through a fuel cell stack preferably in orthogonal directions. Thus all four peripheries of the elements are provided with flow passages for supplying and exhausting air and fuel. As in the prior art, air 28 is introduced at the lower left of the stack, as shown isometrically in FIG. 4, and flows upwards through inlet air ports 50 in the various elements until it reaches distribution spacer 52 wherein the inlet ports 54 are open to air flow space 126, spacer 52 being substantially the same thickness as the height of bumps 124'. Spacer 52 is sealed to cathode 20a by a first perimeter seal 56. Air 28 flows across the surface of cathode 20a and exits the flow space via matching exhaust ports similar to inlet ports 54,50 (not visible in FIG. 4).

A similar distribution system is provided for fuel in the orthogonal direction. Fuel 34 enters the stack from the lower back side, flows upwards through inlet fuel ports 58 in PEN 14b and first interconnect plate 122 until it reaches fuel entry distribution spacer 60 wherein the fuel inlet ports in spacer 60 (not visible in FIG. 4), similar in shape to fuel inlet ports 66 in spacer 64, are open to plenum 146, spacer 60 being substantially the same thickness as the height of bumps 124. Note that the fuel exhaust ports 63 in the opposite edge of first spacer 60 are not open to plenum 146. Consequently, fuel flows through holes 148 in plate 122 into fuel flow space 132. A fuel distribution exit spacer 64 is provided between anode 18b and plate 122 having open fuel exhaust ports 66 connecting to fuel exhaust ports 68. Spacer 64 is sealed to anode 18b by a second perimeter seal 56'.

Figure 6:
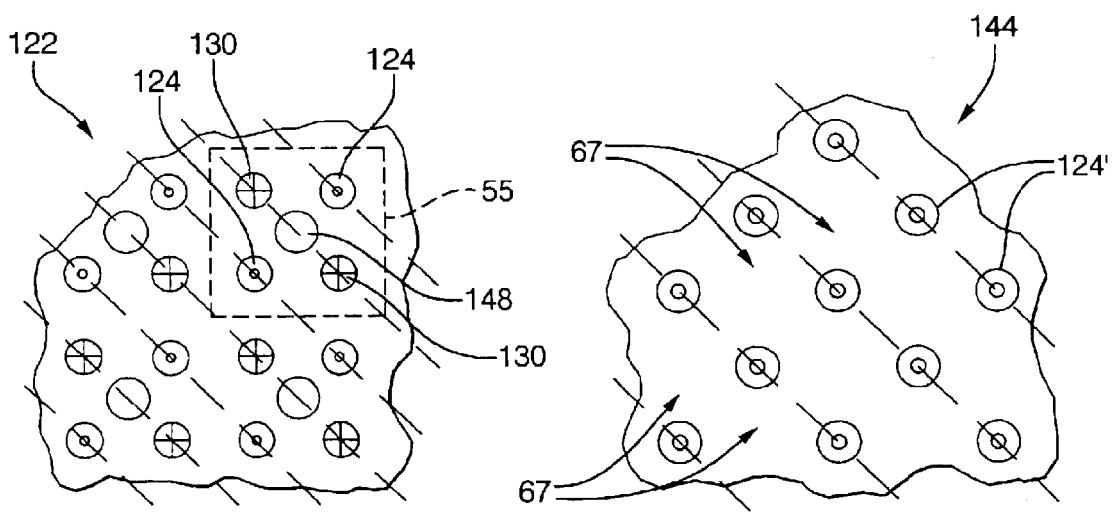
FIG. 6 is a detailed plan view of a portion of a plate forming a second wall of the fuel plenum, showing a currently preferred arrangement of bumps.

Referring to FIGS. 5 and 6, a currently-preferred pattern of holes 148, bumps 124, and dimples 130 is shown for a representative portion of plate 122 (FIG. 5), the repeating module 55 being a hole bracketed by two bumps in a first direction and by two dimples in a second direction, and a currently-preferred pattern of bumps 124' is shown for a representative portion of plate 144 (FIG. 6). In the currently-preferred assembly relationship, bumps 124' are positioned directly over dimples 130 (as shown in FIG. 3). Bumps 124' are actually dimples on the underside of plate 144, from the perspective of plate 122. The preferred assembly relationship thus provides planar regions 67 between bumps 124' for receiving bumps 124.

Referring to FIG. 7, a second embodiment of an improved interconnect 110' and fuel distribution system in accordance with the invention is shown in an improved fuel cell stack 112'. System 110' is similar in many respects to improved system 110, having a first interconnect distribution plate 122' and a second interconnect plate 144' forming a plenum 146' therebetween. Plate 122' is provided with a plurality of holes 148' for distribution of fuel 34 through plate 122' over all portions of the surface of anode 18b. Second plate 144' may be substantially identical to plate 144 in embodiment 110, having bumps 124' for electrically contacting cathode 20a and forming air flow space 126.

Embodiment 110' differs from embodiment 110 in that electrical contact with plate 144' and anode 18b is provided by incorporation of metallic foam 36 or filaments 38 (not shown in FIG. 7) as in the prior art (FIG. 2), alternative to the bumps and dimples shown in first plate 122 in the first embodiment. Preferably, plate 144' is canted as shown in FIG. 7 to progressively diminish the cross-sectional area of plenum 146' in proportion to the reduction in mass flow through the plenum as a function of distance from the plenum entrance.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention include all embodiments falling within the scope and spirit of the appended claims.

What is claimed is:

1. A system for distributing gas from a pressurized source over the surface of an electrode in a fuel cell, comprising:
   a) a first plate off-spaced from said electrode surface and having a plurality of perforations therethrough;
   b) a second plate off-spaced from said first plate to form a plenum therebetween receivable of said gas,
   wherein said first plate is canted relative to said electrode surface, and wherein said gas may be passed through said perforations from said plenum onto said electrode surface.

2. A system in accordance with claim 1 wherein said electrode is an anode and said gas contains hydrogen.

3. A system in accordance with claim 1 wherein said system is disposed between a cathode of a first fuel cell and an anode of a second fuel cell in a fuel cell stack.

4. A system in accordance with claim 3 wherein said system includes conductive means for electrically interconnecting said cathode to said anode.

5. A system in accordance with claim 4 wherein said conductive means includes upsets formed in at least one of said first and second plates.

6. A system in accordance with claim 5 wherein a plurality of said upsets are formed in said second plate and extend therefrom into mechanical contact with said cathode.

7. A system in accordance with claim 5 wherein a plurality of said upsets are formed in said first plate and extend therefrom into mechanical contact with said anode and said second plate.

8. A system in accordance with claim 5 wherein said upsets are arranged in a regular pattern.

9. A system in accordance with claim 8 wherein said pattern formed in said first plate is a regular arrangement including said upsets and said perforations.

10. A system in accordance with claim 4 wherein said conductive means is a metallic foam.

11. A system in accordance with claim 4 wherein said conductive means is a conductive filaments.

12. A system for distributing gas from a pressurized source over the surface of an electrode in a fuel cell, the system being disposed between a cathode of a first fuel cell and an anode of a second fuel cell in a fuel cell stack, said system comprising:
   a) a first plate off-spaced from said electrode surface and having a plurality of perforations therethrough, said perforations having a first axis and a second axis, wherein said first and second axes are generally perpendicular relative to one another;
   b) a second plate off-spaced from said first plate to form a plenum therebetween receivable of said gas, wherein said gas may be passed through said perforations from said plenum onto said electrode surface; and
   c) conductive means for electrically interconnecting said cathode to said anode, said conductive means including upsets formed in said first plate, said upsets extending from said first plate and being in mechanical contact with said anode and said second plate, wherein said upsets are arranged in a regular pattern such that at least one of said upsets is located on the first axis and at least one of the upsets is located on the second axis.

13. A system in accordance with claim 12 wherein said electrode is an anode and said gas contains hydrogen.

14. A system in accordance with claim 12 wherein a plurality of said upsets are formed in said second plate and extend therefrom into mechanical contact with said cathode.

15. A system in accordance with claim 12 wherein said conductive means is a metallic foam.

16. A system in accordance with claim 12 wherein said conductive means is conductive filaments.

* * * * *